(12) United States Patent
Lord

(10) Patent No.: US 7,153,169 B2
(45) Date of Patent: *Dec. 26, 2006

(54) POWER COMPATIBLE UNIVERSAL POWER TIP

(75) Inventor: Charles Lord, Scottsdale, AZ (US)

(73) Assignee: Mobility Electronics, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/300,064

(22) Filed: Dec. 14, 2005

(65) Prior Publication Data

US 2006/0094302 A1    May 4, 2006

Related U.S. Application Data

(63) Continuation of application No. 10/790,877, filed on Mar. 2, 2004, now Pat. No. 6,976,885.

(51) Int. Cl.
*H01R 13/64* (2006.01)

(52) U.S. Cl. ..................................... 439/680

(58) Field of Classification Search ............... 439/680, 439/677, 679, 502, 678
See application file for complete search history.

(56) References Cited

U.S. PATENT DOCUMENTS 4,405,190 A * 9/1983 Schroeder ................. 439/503
5,899,766 A * 5/1999 DeFeo ........................ 439/218
6,540,549 B1 * 4/2003 Rupert ....................... 439/502
6,544,049 B1 * 4/2003 Pierson, Jr. ................. 439/107
6,746,279 B1 * 6/2004 Lopez ........................ 439/620

* cited by examiner

*Primary Examiner*—Chandrika Prasad
(74) *Attorney, Agent, or Firm*—Robert C. Klinger; Jackson Walker LLP (57) ABSTRACT

A keyed power source connector (32) and keyed device connector (14) that are backwards compatible, ensuring that the power rated device connectors can only mate with power source connectors power rated at or above the device connector power rating. One connector is formed as a plug, and the other connector is formed as a socket. The connectors have peripheral contoured body portions (16, 34) having a profile being a function of the respective connector power rating. A keyed portion (41, 62, 72, 82) of the power source connector plug will physically interfere with and not be receivable within a device connector socket when the device connector power rating exceeds the power source connector power rating. This connector system (10) ensures target portable electronic devices coupled to the device connector can not draw power exceeding the rating of the power source connector.

12 Claims, 6 Drawing Sheets

POWER COMPATIBLE UNIVERSAL POWER TIP

CROSS REFERENCE TO RELATED APPLICATIONS

This application is a Continuation of U.S. patent application Ser. No. 10/790,877 entitled "Keyed Universal Power Tip and Power Source Connectors" filed Mar. 2, 2004, now issued as U.S. Pat. No. 6,976,885.

FIELD OF THE INVENTION

The present invention is generally related to electrical connectors, and more particularly to electrical connectors suitable for use with portable electronic devices having varying power requirements, including laptop computers, PDA's, mobile phones, MP3 players, digital cameras, and portable DVD players.

BACKGROUND OF THE INVENTION

In the consumer electronics market there are categories of portable electronic devices ranging from Cellular Telephones, to Personal Digital Assistants (PDA's), to Smart Phones, to Digital Cameras, to Portable DVD Players. Each device has specific power requirements from its' internal battery, or to be powered and/or charge this battery from an external power source, such as an AC wall receptacle or a DC power source.

Universal power converters are now available in the market, including those offered by Mobility Electronics Inc. of Scottsdale Ariz., the Applicant of the present invention. Interchangeable device tips are provided, these tips being compatible with different portable electronic devices, and are adapted to receive power from a common power converter.

Since the power requirement can vary greatly for each device, it is desirable in the universal power supply market to have a methodology of categorizing the power requirements into a series of power supplies. Each power supply can service the specific power range of the electronic device which is targeted.

SUMMARY OF THE INVENTION

The present invention achieves technical advantages as an electrical connector, a set of connectors, and a connector system whereby device connectors are backward compatible with power source connectors such that the device connectors can only be coupled to a power source connector rated at or above the power rating of the power source connector. For instance, a 35 Watt rated device connector can only be coupled with a power source connector rated at 35 Watts and above. Similarly, a 15 Watt device connector can only be coupled to power source connectors rated at 15 Watts and above. The portable electronic device to be powered from drawing power in excess of the power source connector and associated cabling.

In one preferred embodiment, a set of device connectors are provided having conductors terminating at a device connector interface, this interface having a peripheral contoured body portion having a profile being a function of the device connector power rating. A mating power source connector, which may include a cable providing power thereto, has an interface also having a peripheral contoured body portion having a profile being a function of the power source connector power rating. Advantageously, the peripheral contoured body portions of these connectors are configured to mate with each other only when the power rating of the device connector meets or exceeds the power rating of the power source connector. The peripheral contoured body portions are preferable configured as a plug and socket arrangement, each socket having a predetermined power rating can only receive a plug having a compatible power rating.

Advantageously, the power supplies can be developed for a specific power range, wherein device connectors mate to target portable electronic devices and to power source connectors and cables meeting or exceeding the power rating of these target portable electronic devices.

DETAILED DESCRIPTION OF THE PREFERRED EMBODIMENT

Figure 1:
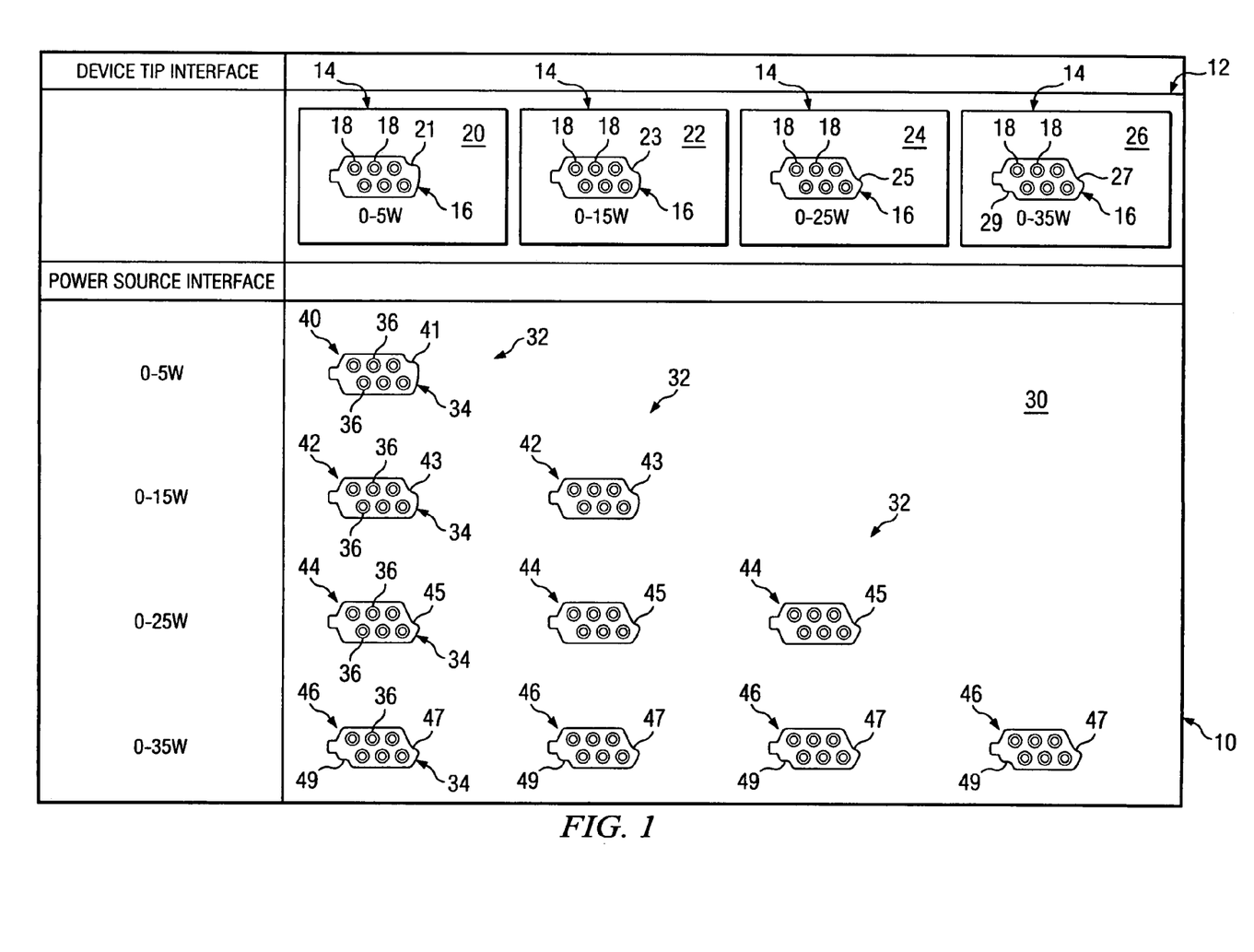
FIG. 1 depicts a set of device connectors and power source connectors each keyed to provide backward compatibility of the power source connectors with the device connectors.

Referring now to FIG. 1, there is generally shown at Keyed connector system 10 comprising a set of device connectors generally shown at 12 and a set of power source connectors generally shown at 30. By way of example, but without limitation to this preferred embodiment, the device connectors are shown to have a connector interface configured as a receptacle, and the power source connectors are configured as plugs. Of course, one skilled in the art will appreciate that the device connector interfaces could comprise of plugs, and the power source connectors could comprise of receptacles if desired.

As shown in FIG. 1, the set of device connectors 12 is seen to comprise of separate and distinct device connectors 14 each having a peripheral contoured body portion 16 encompassing the terminating ends of a plurality of electrical conductors, shown as male pins 18. Four (4) different device connectors are shown at 20, 22, 24 and 26, having respective power ratings of 0–5 Watts, 0–15 Watts, 0–25 Watts, and 0–35 Watts. Each device connector also has a target device connector adapted to mate with target portable electronic devices.

Similarly, the set of power source connectors 30 comprise individual power source connectors 32 each having a peripheral contoured body portion 34 encompassing a respective terminating end of plurality of electrical conductors, shown as female pins 36. In a preferred embodiment, the individual power source connectors 32 are shown as connectors 40, 42, 44, and 46, and having respective power ratings of 0–5 Watts, 0–15 Watts, 0–25 Watts, and 0–35 Watts. As visually depicted in FIG. 1, the 0–5 Watt rated power source connector 40 comprises a plug adapted to be received in only 0–5 Watt rated device connector 20, wherein the peripheral contoured body profile 16 of receptacle 20 is adapted to receive the peripheral contoured body profile 34 of plug 40. The 0–15 Watt rated power source connector 42, however, has a body profile 34 adapted to be received in both of receptacle connectors 20 and 22 since the power connector 42 is at least as great as the device connector power rating, and thus, can safely be mated with device connectors 20 and 22.

Likewise, power source connector 44 is rated at 25 Watts, and thus, has a body profile 34 adapted to be coupled to and received within receptacle 20, 22 and 24. Since power source connector 44 is rated at 25 Watts, the device connectors 14 rated at 25 Watts and below, namely, connectors 20, 22 and 24, are adapted to receive and be safely electrically coupled to power source connector 44.

The highest power rated power source connector depicted in this embodiment is power source connector 46, which has a body profile contour 34 adapted to be received within each of the device connectors 20, 22, 24 and 26 as each of these device connectors are rated at 35 Watts or below, which is at or below the power rating of the power source connector 46.

Still referring to FIG. 1, there is shown that the device connector peripheral contoured body portions 16 are all keyed along the right side thereof, with 5 Watt rated device connector 20 having the largest keyed opening defined by key portion 41 configured as a lobe along the right side thereof such that it can receive all the power source connecters 40, 42, 44 and 46, as will be shown in more detail shortly.

Looking at 0–15 Watt rated device connector 22, for instance, it can be appreciated that the key portion 23 of the body profile 16 is lower than key portion 21 of device connector 20. This key portion 23 is mechanically configured to receive corresponding key portion 42 of connector 43, key portion 45 of connector 44, and key portion 47 of connector 46, but is not adapted to receive the key portion 41 of connector 40 since power source connector 43 is rated lower than the device connector 22.

It can be further appreciated that an additional peripheral contoured body key portion of device connector 26 is shown at 29 for the 35 Watt rated device connector 26. Likewise, a second peripheral contoured body key portion 49 of profile 34 is provided for the 35 Watt rated power source connector 46. The 35 Watt device connector 26 and power source connector 46 have these additional keyed portions 29 and 49 to ensure that the 35 Watt device connector 26 can only mate to the 35 Watt rated power source connector 46.

Figure 2:
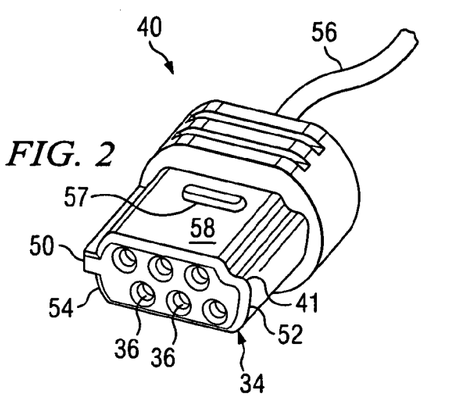
FIG. 2 is a perspective view of a 0–5 Watt rated power source connector keyed such that only device connectors rated at 5 Watts and below are adapted to electrically and physically connect thereto.

Referring now to FIG. 2, there is shown a perspective view of the 5 Watt rated device connector 40 configured as a plug. The peripheral contoured body portion 34 includes the body key portion 41 and an alignment tab 50 providing the keying so as to only be connectable to device connector 20, as previously described. Power source connector 40 is further seen to include a cable portion 56 including a plurality of connectors, each connector coupled to and terminating at one of the female interface pins 36 adapted to receive power from a power source, such as a power converter (not shown). An elongated projection 57, shown as a tab, extending laterally across an upper portion of the connector body 58 is adapted to be releasingly secured within one of the device connectors, such as device connector 20, whereby a corresponding body slot 31 flexibly receives the upwardly corresponding projection 57. A similar projection tab 57 extends from the opposing surface of body 58 (not shown) which is releasingly securable within the opposing slot 31 shown in FIG. 3.

Figure 3:
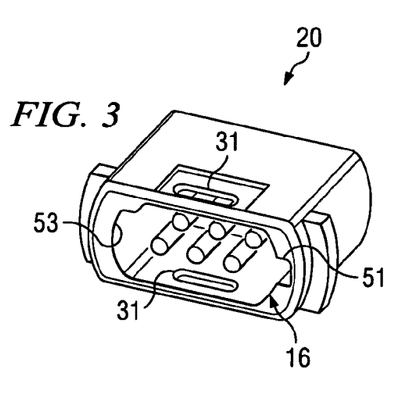
FIG. 3 is a perspective view of a 0–5 Watt rated device connector adapted to receive only a power source connector rated at 5 Watts and above.

The peripheral contoured body portion 16 of device connector 20 has a slot 51 adapted to securingly receive the corresponding tab 50 of the power source connector received therein, and also a keyed portion 53 adapted to receive all of the power source connectors having a power rating greater than the 5 Watt power rating of device connector 20.

Figure 4:
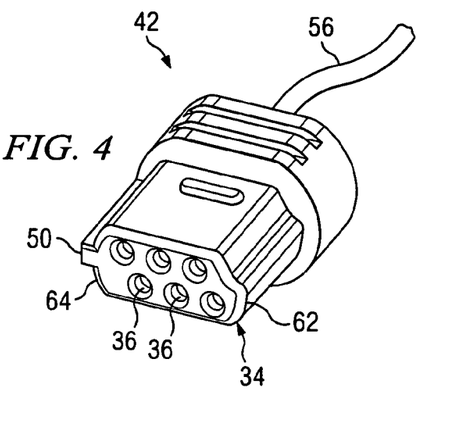
FIG. 4 is a perspective view of a 0–15 Watt rated power source connector keyed to be received in device connectors rated at 15 Watts and below.

Referring to FIG. 4, there is shown a perspective view of the power source connector 42 having a power rating of 0–15 Watts, having a keyed portion 62 and 64 configured to be received in only 5 Watt rated device connector 20 and 15 Watt rated connector 22.

Figure 5:
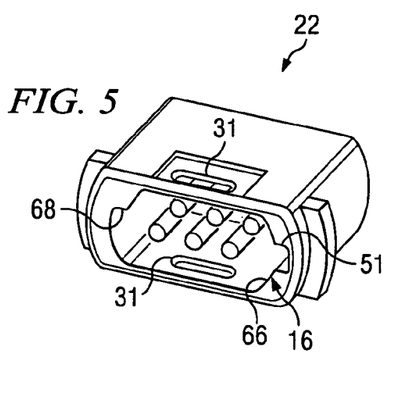
FIG. 5 is a perspective view of a 0–15 Watt rated device connector keyed to receive power source connectors rated at 15 Watts and above.

FIG. 5 shows a perspective view of the device connector 22 having a contoured peripheral body portion 16 including a keyed portion 66 and 68.

Figure 6:
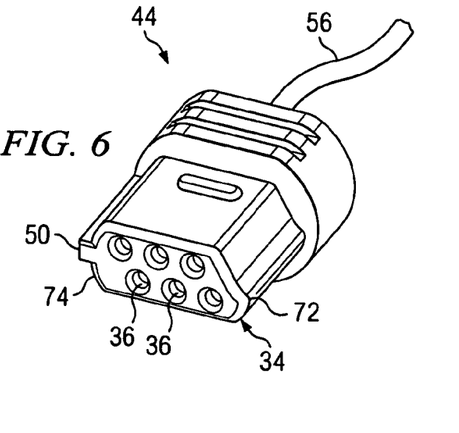
FIG. 6 is a perspective view of a 0–25 Watt rated power source connector keyed to be received in device connectors rated at 25 Watts and below.

Referring now to FIG. 6, there is shown a perspective view of the 0–25 Watt power source connector 44 whereby the peripheral contoured body portion 34 has a keyed portion 72 and 74. This power source connector can only be received in device connectors 20, 22 and 24.

Figure 7:
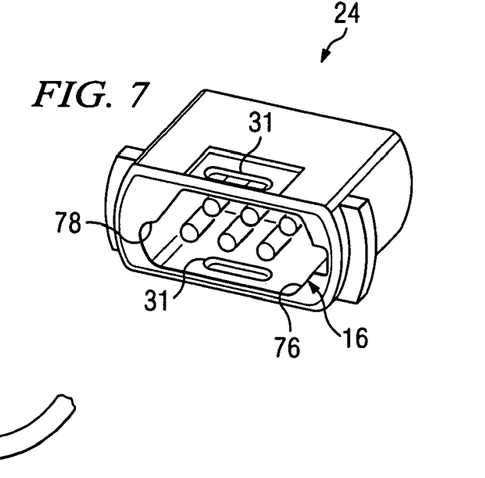
FIG. 7 is a perspective view of a 0–25 Watt rated device connector keyed to receive only power source connectors rated at 25 Watts and above.

Referring to FIG. 7, there is shown a peripheral view of the 0–25 Watt rated device connector 24, whereby the peripheral contoured body portion 16 has a keyed portion 76 and 78. The 0–25 Watt rated device connector 24 is adapted to couple to only the power source connectors having a rating of at least 25 Watts, namely, the 0–25 Watt rated power source connector 44 and the 0–35 Watt power source connector 46.

Figure 8:
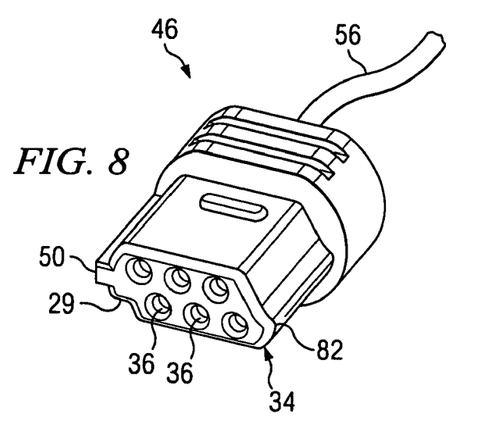
FIG. 8 is a perspective view of a 0–35 Watt rated power source connector keyed to be received in device connectors rated at 35 Watts and below.

Referring now to FIG. 8, there is shown a perspective view of the 0–35 Watt rated device connector 46, whereby the peripheral contoured body portion 34 has a keyed portion 82 and 84.

Figure 9:
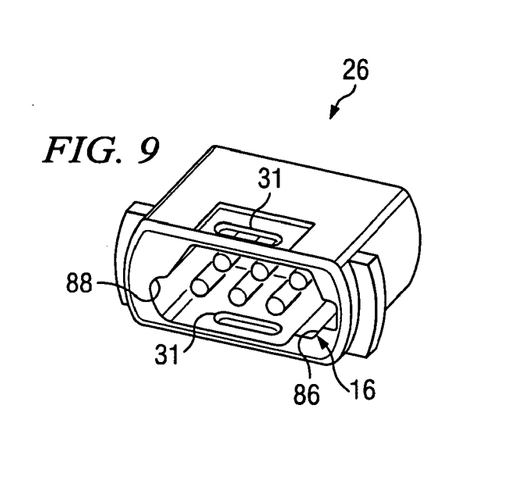
FIG. 9 is a perspective view of a 0–35 Watt rated device connector keyed to receive power source connectors rated at 35 Watts and above.

Referring to FIG. 9, there is shown a perspective view of the 0–35 Watt device connector 26, whereby the peripheral contoured body portion 16 has a keyed portion 86 and 88. This 35 Watt rated device connector 26 is adapted only receive within the 0–35 Watt power source connector 46, as connector 46 is rated to provide at least 35 Watts of power.

Advantageously, each of the power source connectors 40, 42, 44 and 46 are backward compatible such that the power source connectors 32 can only be received within device connectors 14 having a power rating no greater than a connecting power source connector. Advantageously, a target portable electronic device having a power rating, for example, of 25 Watts can only be connectable to a power source connector rated at least as high as 25 Watts so as to not draw more power than the rating of the power source connector 32.

Figure 10:
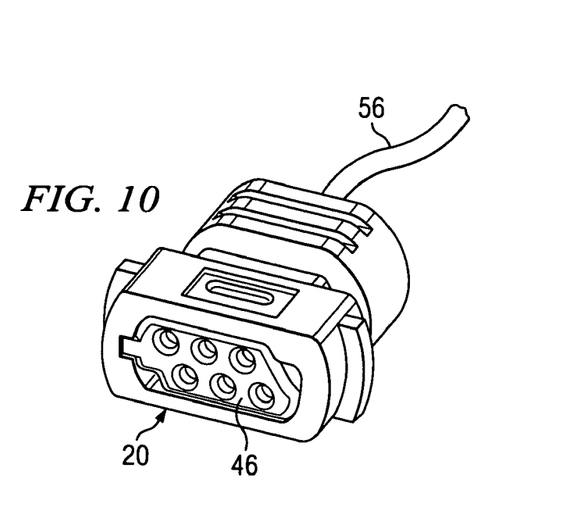
FIG. 10 is a perspective cutaway view of the 0–5 Watt rated device connector securingly receiving the 35 Watt rated power source connector, illustrating a lower power rated device connector engaging a higher power rated source connector.

Referring now to FIG. 10, there is shown one example of the 0–5 Watt rated device connector 20 receiving a 35 Watt power rated source connector 46. The respective keying of device connector 20 and power source connector 46 are shown to not provide an interference fit, and thus allow the secure reception of plug 46 into receptacle 20.

Figure 11:
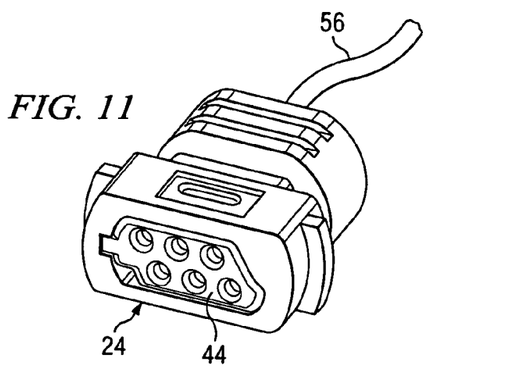
FIG. 11 is a perspective cutaway view of the 0–25 Watt rated device connector securingly receiving the 35 Watt rated power source connector, illustrating a lower power rated device connector engaging a higher power rated source connector.

Referring to FIG. 11, there is shown an example of the 0–25 Watt rated device connector 24 receiving the 35 Watt rated power source connector 44. Again, the respective key portions of plug 44 and receptacle 24 do not provide an interference fit, and thus allow the secure connection to each other.

Figure 12:
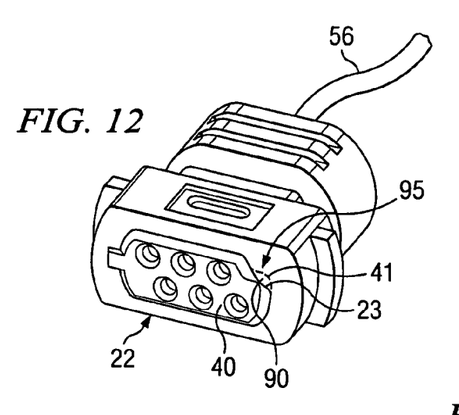
FIG. 12 is a perspective cutaway view of the 0–15 Watt rated device connector theoretically being received within the 5 Watt rated power source connector, which is not possible due to the interference of the power source connector key portion 41 with the device connector key portion 23.

Referring now to FIG. 12, there is shown an illustration of the 0–15 Watt rated device connector 22 physically interfering with a 5 Watt rated power source connector 40, the interference being shown at 90. This, illustration shows the interference of key portion 41 of power source connector 40 with the key portion 23 of device connector 22. Because of this interference, these two connectors can not mate, which advantageously ensures that a higher power rated device connector 14 can never be connected to a lower power rated power source connector 32.

Figure 13:
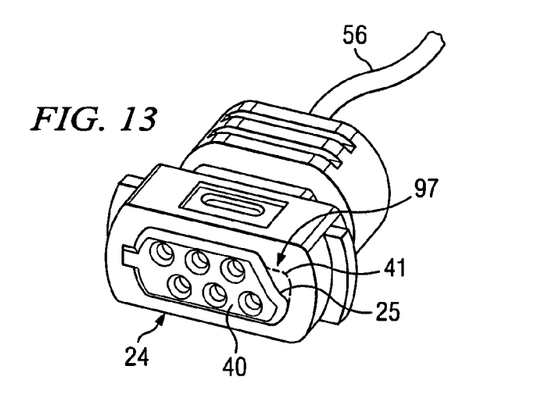
FIG. 13 is a perspective cutaway view of the 0–25 Watt rated device connector theoretically receiving a 5 Watt rated power connector, which is not possible due to the interference of the power source connector key portion 41 with the device connector key portion 25.

Referring to FIG. 13, there is shown yet another illustrating whereby the 0–25 Watt rated device connector 24 would have an interference with the 5 Watt rated power connector 40. Specifically, key portion 41 of power source connector 40 can not be received within the 25 Watt rated device connector 24 because device connector key portion 25 interferes with the key portion 41 of power source connector 40, as shown.

Figure 14:
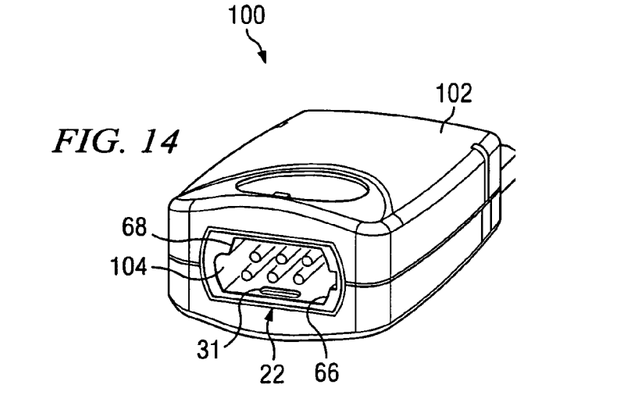
FIG. 14 is a perspective view of one embodiment of a device connector fully assembled in a housing.

Referring now to FIG. 14, there is shown at 100 a tip connector including the 0–15 watt device connector 22 (see FIG. 5) packaged in a housing 102, and a portable electronic device connector 110. The plurality of pins 18 are shown protruding from a socket 104 encompassed by the contoured peripheral body portion 16 including keyed portions 66 and 68.

Figure 15:
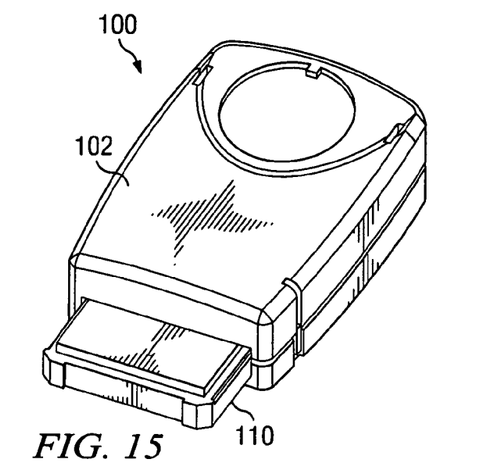
FIG. 15 is an end perspective view of the connector of FIG. 14.

Referring now to FIG. 15, there is shown a perspective rearview of tip connector 100 depicting connector 110 adapted to connect to a portable electronic device to be powered. The shape and/or pin-out of each tip connector 100 will vary from device to device, depending on the interface requirement of such portable electronic device to be powered, and the power rating of the tip connector 100.

Figure 16:
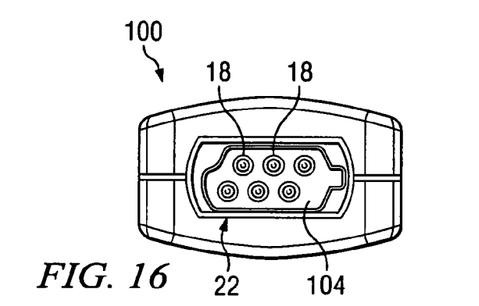
FIG. 16 is an end view of the device connector and of connector 100.

FIG. 16 shows an end view of tip connector 100 further depicting the profile of the socket 104, which as previously described, is adapted to receive the power source connector having, in this embodiment, a power rating of 15 watts and above.

Figure 17:
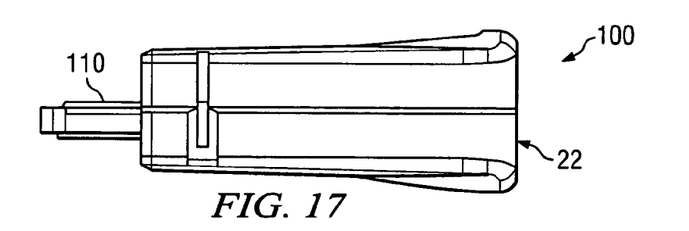
FIG. 17 is a side elevational view of the connector of FIG. 14.
Figure 18:
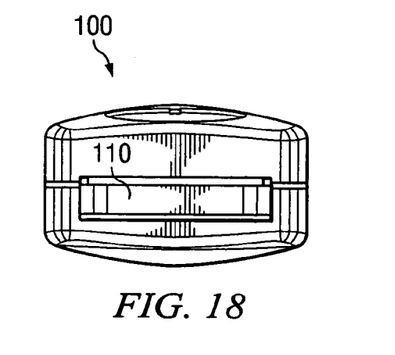
FIG. 18 is an end view of the connector of FIG. 14 illustrating the portable electronic device connector.
Figure 19:
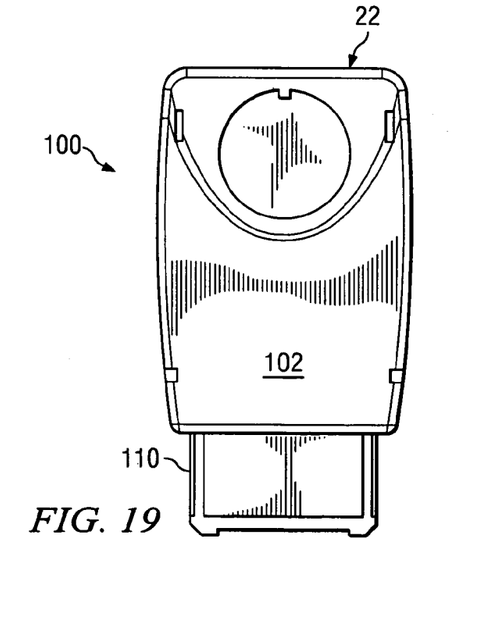
FIG. 19 is a top view of the connector of FIG. 14.
Figure 20:
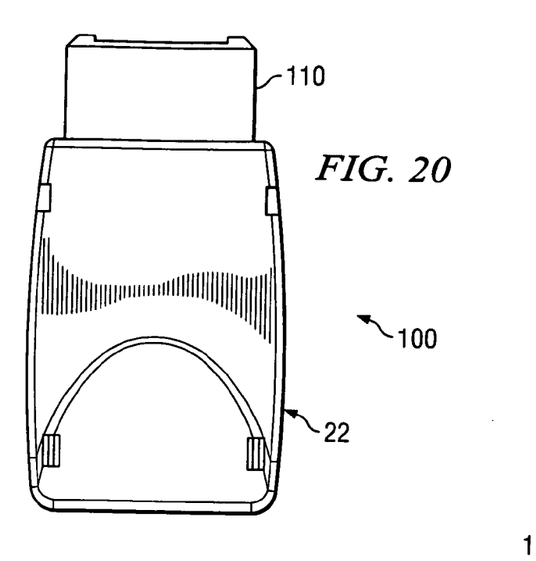
FIG. 20 is a bottom view of the connector of FIG. 14.

FIG. 17 shows a side elevational view of tip connector 100. FIG. 18 shows an end view of connector 100 viewing the connector 110. FIG. 19 is a top view of connector 100, and FIG. 20 is a bottom view of connector 100.

Figure 21:
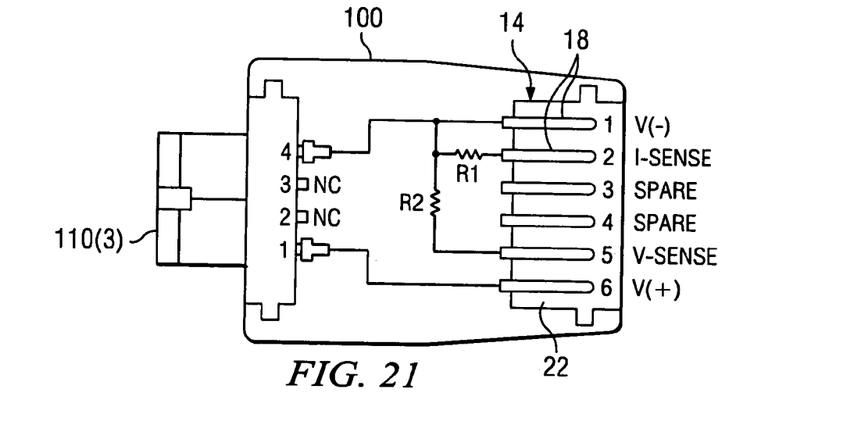
FIG. 21 is an electrical schematic of one embodiment of the connector shown in FIG. 14 illustrating the p-out of the device connector 14 and the portable electronic device connector 110, along with design parameters for one embodiment of the present invention.

Referring now to FIG. 21, there is shown an electrical schematic diagram of one embodiment of tip connector 100, showing one possible pin-out assignment for each of the pins 18 and the pins of portable electronic device connector 110. As shown in FIG. 21, a resistive device network is established between pins 1, 2 and 5 of connector 14 comprising resistors R1 and R2. The values of the resistors R1 and R2 are selected to provide a desired output voltage and desired output current. Shown in this embodiment is an associated parts list, configured such that the output voltage is shown to be 5.21 volts +/−2.5%, output current 0.49 amps +/−5%, whereby resistors R1 and R2 are 1% $\frac{1}{16}$ watt resistors, such that tip connector 100 is configured as a 8 watt power rated connector. Of course, for connectors adapted to power different portable electronic devices, the particular pin-out of connector 110 may vary, and the component values and design parameters are configured to meet the particular requirements of such intended portable electronic device to be powered.

Figure 22:
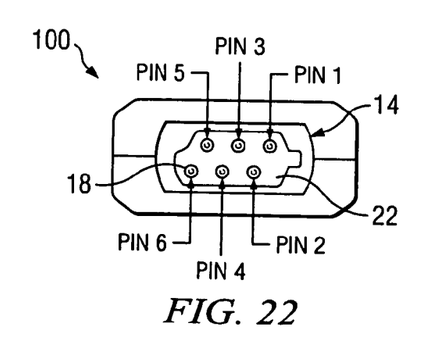
FIG. 22 is an end view of the pin-out of the connector shown in FIG. 21.
Figure 23:
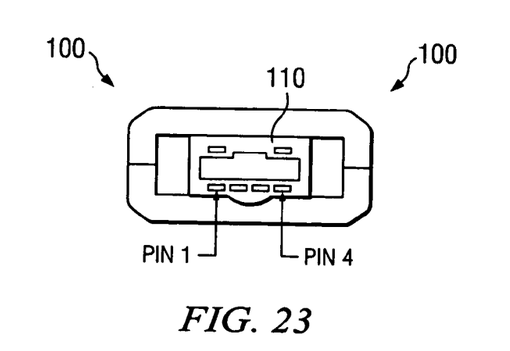
FIG. 23 is an end view of the connector of 21 showing the p-out of the portable electronic device connector.

Referring to FIG. 22, there is shown an end view of device connector 14 of the tip connector 100 shown in FIG. 21, and FIG. 23 depicts the end view of portable electronic device connector 110 in the embodiment shown in FIG. 21, showing the pin-outs of pins 1–4.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. An electrical device connector adapted to couple to a portable electronic device, comprising:
   a body having a plurality of conductors terminating at a first interface, a plurality of conductors terminating at a second interface configured to couple to the portable electronic device;
   wherein the device connector is rated at a predetermined power rating, and is configured to be backward compatible with only a power source connector power rated at a wattage being at least as high as the device connector power rating.

2. The electrical device connector as specified in claim 1 further comprising a peripheral contoured body portion disposed about the first interface and being a function of the device connector power rating.

3. The electrical device connector as specified in claim 1 wherein the device connector power rating is commensurate with a power rating of a portable electronic device adapted to be coupled thereto.

4. The electrical device connector as specified in claim 1 wherein the device connector comprises an electrical component establishing the device connector power rating.

5. The electrical device connector as specified in claim 1 wherein the electrical component comprises a resistor.

6. The electrical device connector as specified in claim 1 wherein the device connector contoured body portion has a keyed portion adapted to interfere with a power source connector power rated below the device connector power rating.

7. The electrical device connector as specified in claim 1 wherein the keyed portion comprises a lobe.

8. A first connector having a first power wattage rating and having a plurality of conductors terminating at a first interface;

at least one second connector having a respective second power wattage rating and having a plurality of conductors terminating at a respective second interface, wherein each of the second connectors has a third interface adapted to couple to a portable electronic device; and wherein the first interface is configured such that only those second connectors having a power wattage rating at or below the power wattage rating of the first connector can be coupled thereto.

9. The first connector as specified in claim 8 wherein the second connectors second interfaces are shaped such that they are backward compatible with the first connector.

10. The first connector as specified in claim 8 wherein the first connector first interface is shaped such that it is backward compatible with the plurality of second connectors.

11. The first connector as specified in claim 8 wherein the first interface is a socket and the second interfaces are plugs.

12. The first connector as specified in claim 8 wherein the first interface is a plug and the second interfaces are sockets.

* * * * *